United States Patent [19]
George

[11] Patent Number: 6,018,804
[45] Date of Patent: *Jan. 25, 2000

[54] DATA BUS ISOLATOR

[75] Inventor: John Barrett George, Carmel, Ind.

[73] Assignee: Thomson Consumer Electronics, Inc., Indianapolis, Ind.

[*] Notice: This patent issued on a continued prosecution application filed under 37 CFR 1.53(d), and is subject to the twenty year patent term provisions of 35 U.S.C. 154(a)(2).

[21] Appl. No.: 08/621,366

[22] Filed: Mar. 25, 1996

[51] Int. Cl.⁷ ..................................... G06F 1/32
[52] U.S. Cl. ........................... 713/324; 713/300
[58] Field of Search ............... 395/750, 750.06; 315/1, 411; 713/324, 300

[56] References Cited

U.S. PATENT DOCUMENTS

| | | |
|---|---|---|
| 4,081,787 | 3/1978 | Lee . |
| 4,737,851 | 4/1988 | Shanley, II et al. ............... 358/190 |
| 4,751,580 | 6/1988 | Fitzgerald et al. ................ 358/190 |
| 4,868,466 | 9/1989 | Lendaro ................................ 315/411 |
| 5,175,441 | 12/1992 | den Hollander ..................... 307/43 |
| 5,317,470 | 5/1994 | Lendaro . |
| 5,327,172 | 7/1994 | Tan et al. ............................. 348/378 |
| 5,353,215 | 10/1994 | Dinwiddie . |
| 5,389,952 | 2/1995 | Kikinis ................................ 345/212 |
| 5,471,625 | 11/1995 | Mussemann et al. .............. 395/750 |
| 5,483,464 | 1/1996 | Song ................................... 364/492 |
| 5,491,794 | 2/1996 | Wu ................................ 395/182.21 |
| 5,515,539 | 5/1996 | Ohashi et al. ................. 395/750.03 |
| 5,594,906 | 1/1997 | Holmes, II et al. ................ 395/750 |
| 5,616,988 | 4/1997 | Kim ....................................... 315/1 |
| 5,623,677 | 4/1997 | Townsley et al. .................. 395/750 |
| 5,630,142 | 5/1997 | Crump et al. ...................... 395/750 |
| 5,649,210 | 7/1997 | Allen .................................. 395/750 |
| 5,659,763 | 8/1997 | Ohashi ............................ 395/750.03 |
| 5,692,203 | 11/1997 | Gradevant ...................... 395/750.03 |
| 5,835,934 | 10/1998 | Tran ................................. 395/750.03 |

OTHER PUBLICATIONS

Optocouplers clamp spikes fast over wide range. Alex Kisin, Electronics Sep. 8, 1981. p. 153.

The Optoelectronics Data Book for Design Engineers, Fifth Edition Texas Instruments Inc. 1978, pp. 149–153.

Primary Examiner—Ayaz R. Sheikh
Assistant Examiner—David A. Wiley
Attorney, Agent, or Firm—Joseph S. Tripoli; Francis A. Davenport; Joseph J. Kolodka

[57] ABSTRACT

A video display with data bus control has a standby and an operate condition. The video display comprises a microprocessor having a bi-directional data bus and is selectably operable in one of the operate and standby modes. A power supply is controllably coupled to the microprocessor for supplying power in one of the operate and the standby modes. An integrated circuit is coupled to the power supply and has bi-directional data bus control capability. A coupling device is responsive to the power supply and couples the bi-directional data bus to the integrated circuit in response to the operate mode and isolates the bi-directional data bus in response to the standby mode.

19 Claims, 1 Drawing Sheet

DATA BUS ISOLATOR

This invention relates to a video display device with microprocessor control, and in particular to data bus coupling during operating and standby modes.

BACKGROUND OF THE INVENTION

In a microprocessor controlled apparatus a data bus is often employed for communication. Usually, since the data source, data recipient and bus are all contained within the apparatus little consideration is given to the techniques employed when data transmission extends beyond the equipment chassis. Many electronic systems facilitate remotely controlled activation and operation. Clearly remote activation requires that some part of the controllable apparatus be on and dissipating power in order to receive the remote command. Hence, in the interest of power conservation, most electronic systems employ two operational conditions namely a STANDBY mode and RUN or OPERATE mode. Effectively two power supplies are provided, a STANDBY supply which is permanently energized while connected to an AC mains supply, and a RUN or OPERATE supply which is turned on following user activation.

In the exemplary apparatus described above, the use of standby and operate modes with their respective power supplies may result in problems occurring between circuitry with power sustained, and circuitry where the power is switched. For example, a data bus may originate from a power sustained microprocessor to provide communication to circuitry powered only during an operate mode. Typically such bus controlled circuitry forms part of an integrated circuit which may include electrostatic discharge protection for any input pins. Typically electrostatic or ESD protection may be provided by a series connected diode structure with the cathode connected to the IC power supply Vcc and the anode connected to the lowest circuit potential, typically ground. The junction of the two diodes is connected to the IC input pin. A diode conducts whenever the input pin potential exceeds the potentials applied to the respective diode ends.

Hence in a system where a data bus originates from a power sustained microprocessor and is coupled to power switched integrated circuit with input pin protection a problem results where the data bus is clamped, usually to the absent switched Vcc supply. The data bus clamping results from current flow between a data bus pull up resistor and an ESD protection diode at the input pin of the IC. Thus the data bus is inoperative and the apparatus is incapable of either remote or local activation.

SUMMARY OF THE INVENTION

A video display with data bus control has a standby and an operate condition. The video display comprises a microprocessor having a bi-directional data bus and is selectably operable in one of the operate and standby modes. A power supply is controllably coupled to the microprocessor for supplying power in one of the operate and the standby modes. An integrated circuit is coupled to the power supply and has bi-directional data bus control capability. A coupling means is responsive to the power supply and couples the bi-directional data bus to the integrated circuit in response to the operate mode and isolates the bi-directional data bus in response to the standby mode.

DETAILED DESCRIPTION

Figure 1:
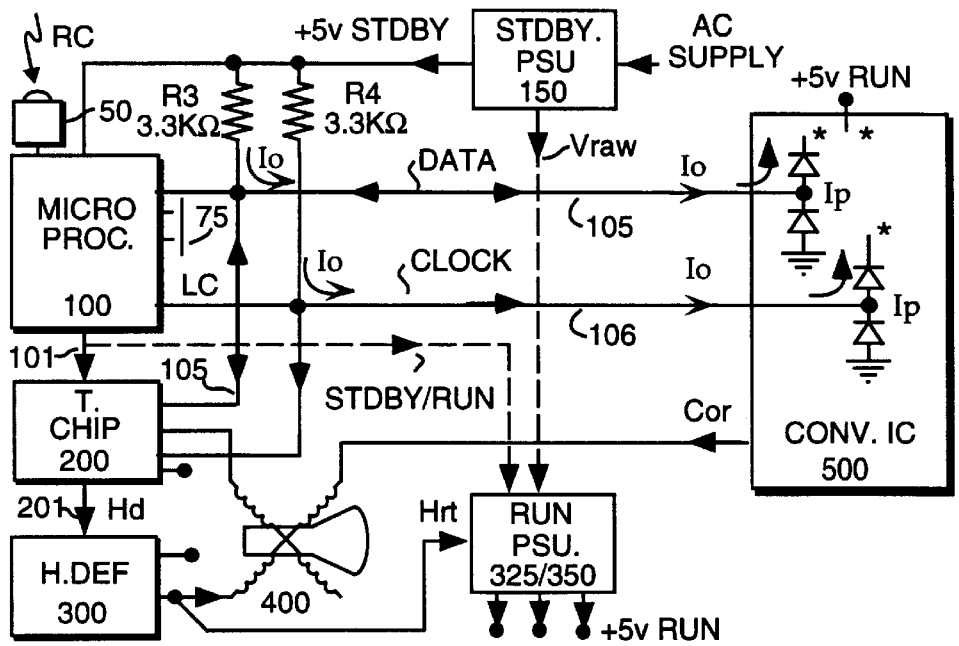
FIG. 1 illustrates an exemplary microprocessor controlled display apparatus.

The exemplary microprocessor controlled video display of FIG. 1 employs a data bus 105, utilizing for example an $I^2C$ protocol for bi-directional communication with other devices connected to the bus. The exemplary video display has three states, namely;

OFF, disconnected from an AC mains supply,

STANDBY, AC mains supplied and operating in a low power dissipation condition, awaiting a control command, OPERATE, fully operational. Once the video display is connected to an AC mains supply, microprocessor 100 assumes a STANDBY condition where only circuitry required to receive and execute control commands RC or LC is maintained in an active power dissipating condition. For example, a remote control receiver 50 may be powered to enable reception of a remote command RC, device mounted switches 75 may be scanned periodically by microprocessor 100 to detect local control LC user activation. Upon receipt of an ON command microprocessor 100 changes the state of a STANDBY/RUN output line 101 which signals the initiation of an OPERATE condition. For example, in a first control embodiment, shown with a solid line in FIG. 1, output line 101 is coupled to a multiple TV function integrated circuit 200. An example of such an IC is a Thomson T chip, which may be directly activated by means of the STANDBY/RUN output signal coupled via line 101. This direct control connection from microprocessor 100 helps to ensure that IC 200 has achieved operational stability prior to microprocessor 100 initiating data bus communication with other bus controlled devices, for example, a digital convergence integrated circuit 500. Integrated circuit 200 may include phase locked oscillators and pulse counting circuitry for generating various display drive signals. A horizontal drive Hd signal 201 is generated by IC 200 and is output, responsive to a microprocessor 100 bus command for coupling to a horizontal deflection stage 300. The horizontal deflection stage 300 generates horizontal frequency deflection signals which are applied to a yoke assembly mounted on a CRT assembly 400 to produce horizontal electron beam deflection. A switch mode power supply 325 is connected to horizontal deflection stage 300 and is driven by horizontal retrace pulses.

In an alternative control embodiment, when microprocessor 100 receives an ON command the STANDBY/RUN output line 101 changes the state to initiate an operate condition. For example, in FIG. 1 output line 101, (shown dotted) is coupled to a switched mode RUN mode power supply 350 which is powered from a raw unregulated DC supply generated by standby power supply 150. The RUN signal on output line 101 enables operation of RUN mode power supply 350 which in turn supplies power to the T chip, horizontal and vertical deflection and the bus controlled deflection IC 500. The T chip is enabled by an ON command transmitted via data bus 105, hence accurate timing is necessary to ensure that RUN mode power supply 350 is activated prior to the transmission of the T chip ON command, sent via data bus 105.

The control methods described for exemplary FIG. 1 may be subject to the problem of data bus and clock bus clamping or latching as described previously. In FIG. 1, deflection integrated circuit 500 is depicted with input protection diodes Ip connected to data bus line 105 and clock line 106, such use is well known. However, when IC 500 is unpowered, for example during the STANDBY mode, a DC conduction path is formed between the +5 volt standby supply and the absent, low impedance +5 volt RUN mode power supply. Currents Io are illustrated flowing from bus pull up resistors R3 and R4 via busses 105 and 106 to respective protection diodes coupled to the absent +5 volt RUN supply. Thus each bus is clamped one diode drop above the nominally ground potential presented by the inactive RUN supply and the loads coupled thereto. Hence Microprocessor 100 is prevented from transmitting or receiving communication via bi-directional data bus 105. Similarly the clock signal on bus 106 is clamped to nominally 0.6 volts which generally immobilizes clocked operation throughout the apparatus.

Figure 2:
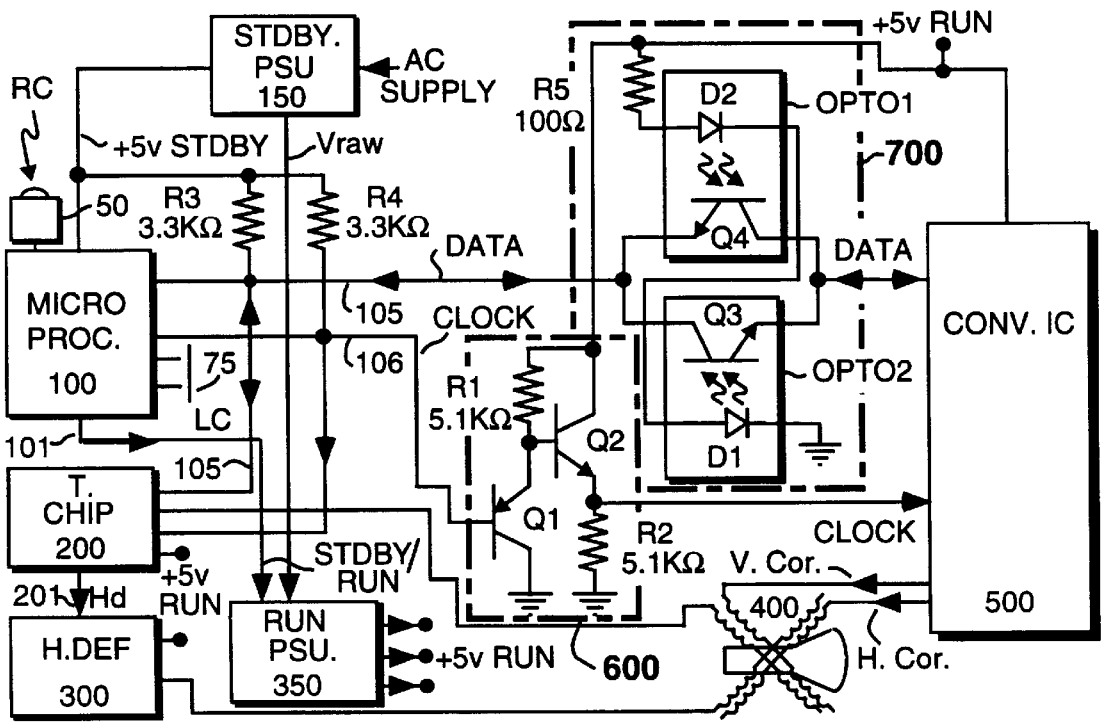
FIG. 2 illustrates the exemplary microprocessor controlled display of FIG. 1 including inventive data bus isolation.

The video display of FIG. 2 is generally similar to that shown in FIG. 1 and similar functions have the same identifier. The video display of FIG. 2 may be controlled to operate generally as described, however, unlike FIG. 1, advantageous bus isolation is provided by inventive elements 600 and 700. Element 600 is a complementary emitter follower which provides a buffer between the clock signal, on bus 106, and deflection IC 500 input protection diodes. The operation of a complementary emitter followers is well known, and may be employed to obviate the introduction of a DC offset to the clock signal. The clock signal is unidirectional on bus 106 and may have any voltage between nominally zero and five volts. When the RUN supply is absent the emitter base junction of PNP transistor Q1 is reverse biased and NPN transistor Q2 is off, thus isolating bus 106.

Element 700 of FIG. 2 illustrates an inventive data bus isolator which employs a pair of opto-couplers connected with an inverse parallel arrangement for isolating data bus 105 responsive to the absence of the +5 volt RUN supply. Opto-couplers are also known as opto-isolators or photo-couplers and often may be utilized to provide electrical isolation between a source of activating illumination and photo sensitive semiconductor. However, in the inventive arrangement of element 700, the opto-coupled isolation property is utilized to provide data bus coupling controlled responsive to the presence or absence of a power supply voltage. Data bus 105 utilizes an $I^2C$ protocol which provides bi-directional communication between microprocessor 100 and the other devices connected to the bus. Microprocessor 100 addresses specific bus connected devices which acknowledge receipt of the bus instruction by pulling bus 105 low. Thus to facilitate the device reply, data bus isolator 700 is required to provide bi-directional transmission with a symmetrical, low impedance. Data bus isolator 700 advantageously provides the required symmetrical bi-directional transmission by utilizing an inverse parallel arrangement of photo-transistors Q3 and Q4. Phototransistors Q3 and Q4 are controllably illuminated by respective light emitting diodes D1 and D2 which are connected in series and energized via a resistor R5 coupled to a +5 volt RUN mode supply. Thus when the +5 volt RUN mode supply is enabled, photo-transistors Q3 and Q4 are illuminated by their respective LEDs and provide by means of their inverse parallel connection, a low impedance bi-directional coupling between data bus 105 and deflection IC 500. In the STANDBY operating mode the +5 volt RUN mode supply is not generated, consequently respective light emitting diodes D1 and D2 are not energized and respective photo-transistors Q3 and Q4 are non-conductive. Thus data bus 105 is isolated from input protection effects of deflection IC 500.

The advantageous opto-coupling properties of element 700 may also be provided by means of an opto-coupling device employing a photo sensitive field effect transistor. Since the photo field effect transistor or FET may provide symmetrical bi-directional coupling, a single device may be substituted for the inverse parallel connection of OPTO1 and OPTO2. However, manufacturing cost considerations may preclude the use of such device which may represent a cost increase of greater than 300% when compared with the use of photo transistor couplers OPTO1 and OPTO2.

The functionality of element 700 may also be advantageously provided by a reed relay. When energized by the RUN supply the reed relay couples bi-directional bus 105 to IC 500, and in the absence of the RUN supply disconnects bus 105 from IC 500, thus preventing clamping action by the input protection diodes. The use of a reed relay provides truly bi-directional data bus coupling, however when material cost is considered, the use of a reed relay represents a cost increase of about 300% over that of inverse parallel connected couplers OPTO1 and OPTO2.

What is claimed is:

1. A video display with data bus control having a standby and an operate condition, comprising:

a first integrated circuit coupled to a bi-directional data bus and operable in an operate mode and a standby mode;

a power supply for supplying power in said operate mode and being de-energized in said standby mode;

a second integrated circuit energized by said power supply only in said operate mode and de-energized in said standby mode, said second integrated circuit subjecting said data bus to latching via said de-energized power supply during said standby mode when said first integrated circuit communicates thereon; and a switching device for coupling said bi-directional data bus to said second integrated circuit to enable communication over said bi-directional data bus to said second integrated circuit during said operate mode and disconnecting said bi-directional data bus from said second integrated circuit and preventing a conduction between said bi-directional data bus and said second integrated circuit during said standby mode to prevent said latching of said data bus to said second integrated circuit.

2. The video display of claim 1, wherein said bi-directional data bus is external to both said first and second integrated circuits to enable said first integrated circuit to communicate thereon during said standby mode to other circuits when said switching device disconnects said data bus from said second integrated circuit.

3. The video display of claim 1, wherein said second integrated circuit comprises input pin protection from electrostatic discharge within said second integrated circuit, said input pin protection being coupled to low impedance and capable of being energized by signals on said bi-directional data bus generated by said first integrated circuit during said standby mode.

4. The video display of claim 1, wherein said switching device comprises inverse parallel connected photo-transistors.

5. The video display of claim 4, wherein said inverse parallel connected photo-transistors couple said bi-directional data bus between emitter and collector electrodes activated by respective light emitting diodes of said opto-couplers.

6. The video display of claim 5, wherein said light emitting diodes of said opto-couplers are series connected for activation by said power supply.

7. The video display of claim 1, wherein a horizontal deflection circuit initiates operation responsive to a horizontal drive signal initiated by said microprocessor.

8. The video display of claim 7, wherein said power supply switches to said operate mode responsive to operation of said horizontal deflection circuit.

9. An apparatus having a standby mode and an operate mode, said apparatus comprising:
- a first integrated circuit operable in said standby mode and said operate mode and capable of generating data for data bus transmission in both said standby and operate modes;
- a data bus external to and coupled to said first integrated circuit for transmission of said data;
- a second integrated circuit; and
- a switching device external to said second integrated circuit and operable during said operate mode to couple said external data bus and said second integrated circuit and operable during said standby mode to selectively isolate said second integrated circuit from said external data bus while permitting communication of said data generated by said first integrated circuit over said external data bus during said standby mode.

10. The apparatus of claim 9, wherein said data bus transmission is bi-directional.

11. The apparatus of claim 9, wherein said switching device comprises a pair of photo-couplers having an inverse parallel arrangement.

12. The apparatus of claim 9, wherein said switching device comprises a pair of photo-couplers each comprising a photo-sensitive semiconductor and a light emitting diode.

13. The apparatus of claim 12, wherein said photo-sensitive semiconductors are coupled in an inverse parallel arrangement.

14. The apparatus of claim 12, wherein said light emitting diodes are connected for conduction in a series arrangement.

15. The apparatus of claim 12, wherein said first integrated circuit comprises a processor circuit and said series arranged light emitting diodes are powered responsive to one of said standby and operate modes.

16. The apparatus of claim 9, wherein said second integrated circuit comprises input terminals coupled to protection diodes.

17. The apparatus of claim 9, wherein said first integrated circuit comprises a processor circuit.

18. The apparatus of claim 9, further comprising a second switch for coupling a clock signal to said second integrated circuit, said second switch enabling transmission of said clock signal to said second integrated circuit during said operate mode and isolating said clock signal transmission during said standby mode.

19. The apparatus of claim 9, further comprising a third integrated circuit coupled to said external data bus and supplied with control data from said first integrated circuit via said external data bus during said standby mode.

* * * * *